July 14, 1942.
H. T. RANDALL
2,289,519
WINDER
Filed May 3, 1940
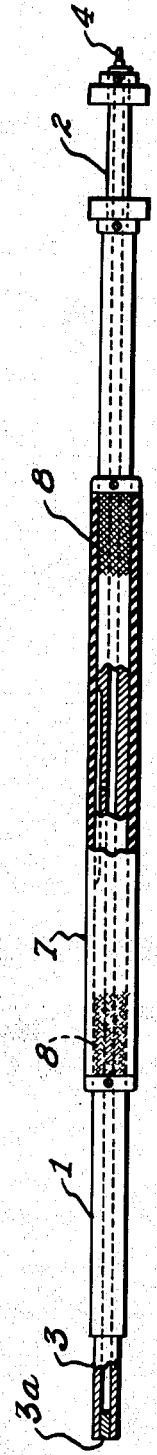
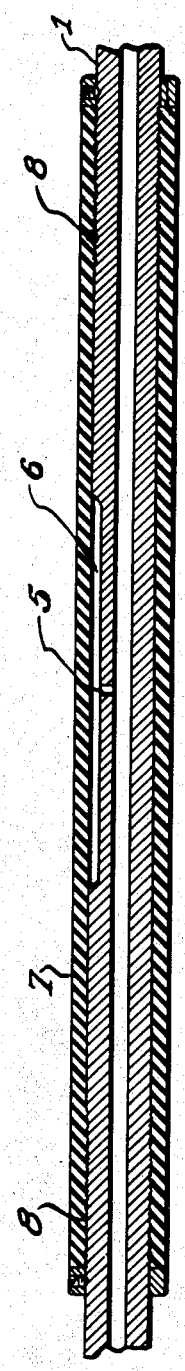
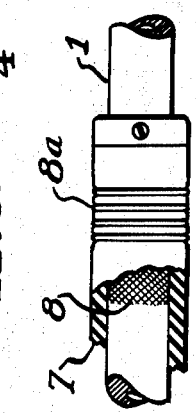
Fig.1. Fig.2. Fig.3. Fig.4. Fig.5.
INVENTOR.
HERBERT T. RANDALL.
BY Allen & Allen
ATTORNEYS.

Patented July 14, 1942

2,289,519

UNITED STATES PATENT OFFICE 2,289,519

WINDER

Herbert T. Randall, Hamilton, Ohio

Application May 3, 1940, Serial No. 333,176

1 Claim. (Cl. 242—72)

My invention relates to winding machines such as are used for winding rolls of paper or other flexible webs, and more particularly to the spindles for such machines.

It is the object of my invention to provide a pneumatic expanding spindle or core shaft upon which to mount the cores or shells upon which a web is to be wound. By the use of this spindle or core shaft it is possible to mount a winder core thereon and remove it therefrom quite rapidly and without the use of collars and set screws, as well as to provide a lengthwise adjustment of the core along the spindle without any difficulty, since the expanding spindle will hold the sleeve in a wide range of positions. Specifically I locate about a hollow shaft, an expansible rubber sleeve, which is vulcanized or otherwise very tightly bound at its ends to the shafts. By the use of an ordinary automobile tire valve in the end of the shaft I can then inflate the rubber sleeve or deflate it at will. The winder cores or shells will slip over the rubber sleeve when it is deflated but will be held fast by the rubber sleeve when it is inflated. The winder core may be of whatever length is required for any operation, and as long as a substantial portion thereof is engaged by the expanding rubber sleeve, it can be located so as to line up with the line of delivery of the web to be wound.

An example of my invention is shown in the drawings and will be described in the matter that follows. The novel and patentable feature inherent in my invention of which the described device is an example, will be set forth in the appended claim to which reference is hereby made.

Figure 1 is an elevational view with parts broken away and certain parts in section.

Fig. 2 is an enlarged sectional view showing details of the expansible portion of the shaft, but in contracted position.

Fig. 3 is a sectional view similar to Fig. 2, but showing the sleeve expanded to engage a core or shell.

Fig. 4 is a section taken on line 4—4 of Fig. 3, and

Fig. 5 is a fragmentary view illustrating a wire binding applied to the sleeve to prevent leakage under high pressure.

At 1 is illustrated a spindle which is hollow, and is of smaller diameter at the ends at 2 and 3, where it is to be mounted in the journals of a winding machine that will impart rotation thereto in the usual manner. At one end the spindle is closed as at $3^a$, and at the other end is equipped with a Schrader valve 4.

There is a port 5 at one or more points along the spindle and preferably a channel 6 in the spindle with which the port or ports communicate. A section of rubber tubing forming a sleeve 7 is set over the spindle, and the ends of the tube are vulcanized to the spindle as at 8, where the spindle is preferably knurled to assist the vulcanized bond. It may further be desirable to bind the vulcanized ends externally as indicated at $8a$ in Fig. 5.

The shells, or roll cores on which paper or the like is to be wound, will have an internal diameter slightly greater than that of the deflated tube. I have shown a shell or core 9 (Fig. 3). When air under pressure is forced into the spindle, the rubber sleeve will expand and hold the core or shell in the position in which it is placed prior to inflating.

In operation the spindle will be removed from the winder and the valve released to permit deflation. A core will then be slipped over the spindle and sleeve, and the spindle mounted in the winder. The operator threads the web to be wound through the winder and lines up the shell or core with the trimmed edges of the web. The shell will be of a length equal to the width of the web to be wound up. Where slitters are used, they may be set and the core or shell be positioned to accommodate the position of the slitters.

When the core is in the correct position an air pressure hose is applied to the valve in the spindle to inflate the rubber sleeve. In the devices in use according to my description above, 100 pounds pressure has been used with success.

There is none of the difficulty of lock nuts, set screws, conical collars and the like which are used in winders with which I am familiar. The changing of cores is accomplished by removing the spindle and bleeding the valve whereupon the mounted core becomes loose. There is no necessity of locking up the core before mounting the spindle in the winder thus necessitating careful measurements as a preliminary to location of the core. In my device the core is adjusted to position after it is in the machine as has been described.

Having thus described my invention what I claim as new and desire to secure by Letters Patent, is:

In a core shaft for winders, a mandrel having a bore communicating with the outside of the mandrel intermediate its ends, an inflatable sleeve mounted over said mandrel, said sleeve being vulcanized at its ends to the mandrel and passing over the communication from the bore, and an outer winder tube of a size only slightly larger than the inflatable sleeve when the same is deflated open at its ends, and located on the outside of the sleeve covered mandrel, said tube sleeve and mandrel arranged for direct contact between the tube and sleeve, the latter being the sole gripping means for the winder tube, and a valve located in the end of the mandrel beyond the end of the sleeve, for receiving an air connection for inflating the sleeve through the bore, said bore being closed except for said valve, at both ends thereof.

HERBERT T. RANDALL.